United States Patent
Zhang

[19]

[11] Patent Number: 5,983,232
[45] Date of Patent: Nov. 9, 1999

[54] VIRTUAL STRUCTURED INFORMATION SYSTEM

[75] Inventor: Tao Zhang, Ann Arbor, Mich.

[73] Assignee: Triada, Ltd., Ann Arbor, Mich.

[21] Appl. No.: 09/162,186

[22] Filed: Sep. 28, 1998

Related U.S. Application Data

[60] Provisional application No. 60/060,377, Sep. 29, 1997.

[51] Int. Cl.$^6$ ..................................................... G06F 17/30
[52] U.S. Cl. ........................................... 707/102; 707/100
[58] Field of Search ......................... 707/1–10, 100–104, 707/200–206; 345/419; 364/265.5, 285.4, 927.2; 395/185.03, 828

[56] References Cited

U.S. PATENT DOCUMENTS

| | | | |
|---|---|---|---|
| 5,226,148 | 7/1993 | Littlewood | 395/185.03 |
| 5,452,468 | 9/1995 | Peterson | 345/419 |
| 5,471,611 | 11/1995 | McGregor | 707/4 |
| 5,504,884 | 4/1996 | Kyuma et al. | 707/5 |
| 5,797,031 | 8/1998 | Shiparo et al. | 395/828 |

OTHER PUBLICATIONS

On–line event reconstruction using a parallel in–memory database; E. Argante, P. v.d. Stock, I. Willers; Engineering of Complex Computer Systems Conference, pp. 207–210, 1995.

*Primary Examiner*—Ruay Lian Ho
*Attorney, Agent, or Firm*—Gifford, Krass, Groh, Sprinkle, Anderson & Citkowski, PC

[57] ABSTRACT

A virtual structured information system or a virtual database is developed and presented in the framework of an information theory for multiple source information systems such as databases. A virtual tree structure is built from virtual nodes in main memory which contain no raw data. The virtual nodes and virtual trees provide general non-data virtual structure, like cross-table nodes, for systematic information manipulations such as on-line analytical processing in a structured information system.

8 Claims, 1 Drawing Sheet

VIRTUAL STRUCTURED INFORMATION SYSTEM

REFERENCE TO RELATED APPLICATION

This application claims priority of U.S. provisional patent application Ser. No. 60/060,377, filed Sep. 29, 1997, the entire contents of which are incorporated herein by reference.

BACKGROUND OF THE INVENTION

As set forth in commonly assigned U.S. Pat. Nos. 5,245,337, 5,293,164, and 5,592,667, a multi-dimensional approach has been developed for transforming an unstructured information system into a structured information system. This approach addresses the unique properties of multiple information source systems, including database systems, from an information point of view. In particular, this new methodology attempts to unify the two fields of information theory and database by combining the encoding compression theory and the database theory for general data manipulations into a general information manipulation theory with respect to multi-dimensional information space.

Broadly, multiple information sources are described by different information variables, each corresponding to one information source or information stream. Information manipulations are primarily index manipulations which are, in general, more efficient than non-index manipulations of the same number. The only non-index manipulations are carried out at leaf nodes where unique data values are stored. Therefore, the non-index manipulations are minimized. As a further aspect of this approach, a structured information system or database is built by taking into account information relations between different sets of data in the database. Such relations between neighboring nodes are easily analyzed and presented on-line because they are built into the structure. Relations between nodes that are not neighbors are not explicitly built into the existing structure. On-line analysis on these relations requires efficient information manipulations in main memory.

However, only a limited amount of such statistical information is explicitly built into the structured database information system. For example, information about double patterns made up of two leaf nodes of single patterns is easily shown in the case of two neighboring leaf nodes which have a common parent node of double patterns in an existing tree structure. Analyzing pattern statistics between any two leaf nodes that do not have a common double-pattern parent node in the existing tree structure could be difficult because the statistics is not explicitly stored at any node in the existing structure. Such analysis would be greatly simplified if one could build a double-pattern node in main memory, that has the exact same properties as if it were built from the raw data. In order to build this node efficiently, no data values should be involved, that is, using only manipulations of the memory tokens.

SUMMARY OF THE INVENTION

The subject invention extends the approach outlined above by providing a method of building a virtual node or tree structure for general and systematic on-line analytical processing (OLAP) and other data mining analysis in an associative memory database (AMDB). The invention provides a novel structured database used to store useful statistical information about the data behind the AMDB.

In essence, the invention transforms an existing tree structure into a different tree structure which may be used to readily reveal and analyze statistical relations between any two leaf nodes, or any number of leaf nodes, in the input structure. From an information view point, the new structure makes possible the analysis of mutual relations between any two single information sources in a structured multiple source information system.

The tree structure that is built from an existing tree structure is called a virtual structure or a virtual information system, and contains no original data. The virtual tree is built from a plurality of virtual nodes, each node being representative of a virtual information source in that it takes no disk space and exists only in main memory, while having all the properties of a real node or information source.

A virtual node can be built from any two real leaf or internal nodes in an existing tree structure. A virtual node built from two AMDB tables or two multiple source information systems connected by two referential nodes or two single information sources is quite similar to the so-called "cross-table node" in existing data mining techniques. However, a virtual node is built from unique non-data information values, whereas a cross-table node is built from two sets of data values which may have high information redundancy. The resulting virtual tree structure is equivalent to a virtual relational table or a virtual information system in which there is no raw data values.

BRIEF DESCRIPTION OF THE DRAWING

The FIGURE illustrates important steps according to a method of the invention.

DETAILED DESCRIPTION OF THE INVENTION

Figure 1:
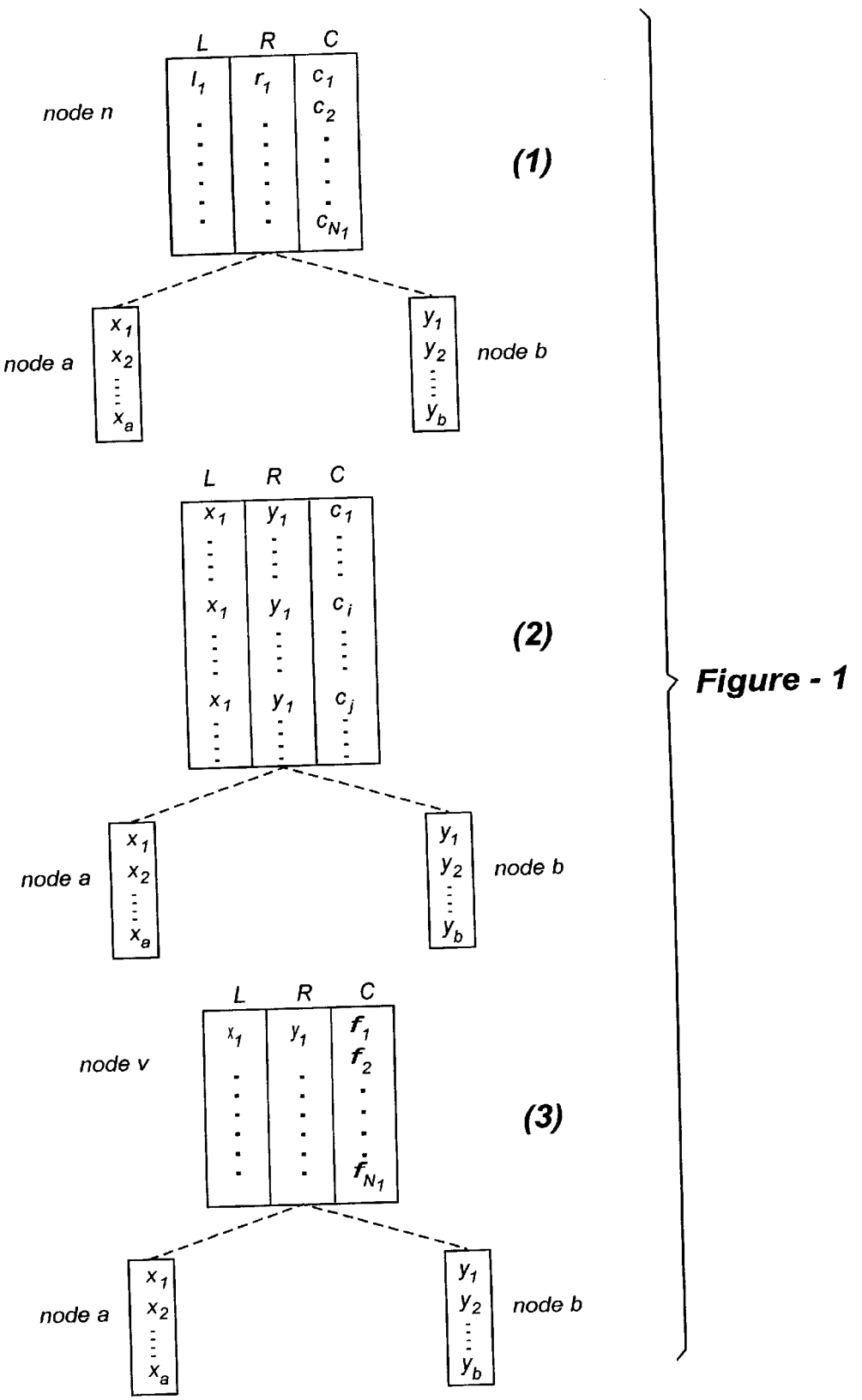

In proceeding with the method of the invention, the general approach is to build a virtual tree structure by building a number of unstructured virtual information sources at a given memory node in an existing memory tree structure. The unstructured virtual information sources are information streams of memory tokens or indices of some leaf nodes in the existing structure. A virtual structure is then built from the unstructured virtual sources.

In practice, it is noted that all the memory tokens or indices of the involved leaf nodes at the memory information source of the closest common ancestor node in an existing tree structure. As such, the leaf node tokens may be propagated to the closest common ancestor node. Here, the memory indices of the leaf nodes are the memory addresses of the unique data values of the corresponding dictionaries. A memory information source at a given node is an information stream of information values of its children nodes, with the number of information events being equal to the cardinality of the node.

The above recalling or propagating procedure is equivalent to building a sub-database of indices of a size of record number equal to the cardinality of the ancestor node. A tree structure is then built from these recalled or propagated multiple information sources. However, this method does not make full use of statistical information already built into the existing tree structure. In particular, the most useful virtual structure of a single virtual node can be built more efficiently after taking into account of the relations that are already stored explicitly in the existing structure. Note that the above general procedure involves only index manipulations. That is, no data values are needed to build a virtual node since the dictionaries of the leaf nodes that are children nodes of the virtual node are already stored in the existing structure. It is also important to note that the information entropy of the virtual information system for building the virtual structure is minimized.

With regard to more specific steps, we start with a single virtual node since it is the easiest one to build and is the most useful one for on-line analytical processing (see Figure ). The first step in building a virtual node is to find the closest common ancestor node for a given two nodes in an existing tree structure, from which the virtual node is going to be built. Let us assume that the two nodes are "a" and "b" and are, for example, two leaf nodes on the existing tree built on disks. The common ancestor node is $n_a$. By definition, the closest common ancestor node has a child node that is an ancestor node of only one node of the two nodes a and b. Similarly, the other child node of the common ancestor node $n_a$ is an ancestor node of the other one of the two nodes a and b. For simplicity, assume the left child node n, of the common ancestor node $n_a$ is an ancestor node of a, but not b. By the same token, the right child node $n_r$ of the node $n_a$ is an ancestor node of b, but not a.

Next, we recall the memory tokens (which are the memory addresses of unique data values) of node a at the memory of node $n_1$ or propagate the a tokens to node $n_1$. This replaces the original tokens stored at the $n_1$ memory with the recalled tokens of node a using look-up tables. Similarly, we recall the tokens of node b at the memory of node $n_r$ or propagate the b tokens to node $n_r$.

If node $n_a$ has memory structure in some sort of hashing, the virtual node may be built more easily. For example, consider the left hashing structure which stores a set of lists. Each list is indexed by a memory token of the left child node $n_1$ and stores a number of tokens of the right child node $n_r$. The right child tokens in each list pairs with the same left child token. After recalling the leaf node tokens and replacing the $n_1$ memory tokens with the a tokens and replacing the $n_r$ tokens with the b tokens, the list indices contain duplicates and the list elements in each list may also have repetitions. Therefore, we reduce the redundancy of the list indices by combining all the lists that have the same list index.

After reduction of redundant list indices, all the new lists have unique indices. Then, we reduce redundant list elements by eliminating them and keeping a count of the repeats in each new list. Once this is done, we obtain a virtual node memory structure identical to a real node as if it were built from the output streams of two leaf nodes a and b.

The single virtual node is very useful in on-line analysis. For example, double patterns of the field values of a and b exist in rows or records. They can be easily presented on the virtual node by replacing the memory tokens in pairs by the corresponding field values after recalling dictionaries. The patterns are shown with counts. Patterns existing in columns can also be presented. For example, patterns in the leaf node b associated with each data value in node a may be easily presented by printing out a list of data values of node b pairing with the same list index representing the corresponding data value in node a. Similarly, patterns in node a associated with a given data value in node b can be presented easily from the right hashing memory structure.

EXAMPLE

Assume two fields a and b in a database of 32844 records have 28 and 17 unique data values. The double-pattern node built from these two fields has cardinality of 476 or 476 unique double patterns. Although a real node of cardinality 476 could be built from the two fields a and b in raw data., assume we do not have raw data. Instead, we have a tree structure on disks, in which leaf nodes a and b have an closest common ancestor node which happens to be the root node of the existing tree. The cardinal root node has cardinality of 32844, and has left child node n, and right child node nr. The left child node has cardinality of 5000, and is an ancestor node of a, but not b. The right child node has cardinality of 1000, and is an ancestor node of b, but not a.

With this introduction, the method of building a virtual node according to the invention proceeds as follows. Recall tokens of node a at node $n_1$ or propagate the a tokens to node $n_1$ which is equivalent to replacing the tokens of node $n_1$ by tokens of node a. Recall tokens of node b and replace tokens of node $n_r$ by the recalled tokens or propagate the tokens of node b to node $n_r$. Note that before the recall, the list indices in a left hashing memory structure are unique tokens of the left child node $n_1$, from 0 to 4999. After the recall, 5000 unique tokens are replaced by 28 different tokens of node a since there were numerous repetitions. Similarly, the unique tokens of node n, stored in each list, are replaced by 17 tokens of node b.

Although redundant tokens in a given list are expected, they can be eliminated in each list while keeping the counts of the repeats. We may then combine those lists which have an identical list index or the same token of node a, such that after the combination, we have 28 lists each corresponds to unique new list index. Once again, we have eliminated the redundant list elements arising from combined lists while keeping track of the repeats. Finally, we obtain a virtual node memory structure made up of 28 lists each of which has 17 unique elements, reproducing a real node as if it were built from raw data.

Printing out 476 pairs of data values of fields a and b shows a double patterns in rows. Printing out a given list of 17 data values after recalling the dictionary is equivalent to presenting 17 field values in field b, that pair with the same field value in field a. If a right hashing table is used in building the memory structure, we would have 17 lists each of which has 28 unique elements.

For a tree of two virtual nodes, it could become more difficult to build the tree depending on the structure. Here are two scenarios: First, the two fields that make the double-pattern virtual node have an closest common ancestor node that is different from the closest common ancestor node of the three leaves that make the whole triplet virtual tree; or second, the common ancestor node of the two fields that build the double-pattern virtual node is the same ancestor node of the three leaves. In the second case, we have to use the general method to recall the tokens of all three leaf nodes at their common ancestor node memory information source or propagate the leaf tokens to their common ancestor node. We may then build a double-pattern virtual node and a triple-pattern virtual node.

In the first scenario, we recall the tokens of the two leaf nodes that make the double-pattern virtual node at their closest common ancestor node and build the double-pattern virtual node there. We recall the tokens of the double-pattern virtual node at the corresponding child node of the triplet ancestor node and recall the tokens of the third leaf node at the other child node of the triplet ancestor node. The triplet virtual node is built using the scheme for building double-pattern virtual node described above.

For a tree with more virtual nodes, one always can use the general method to build the virtual tree. Simplification is possible whenever the common ancestor node of a subpattern is different from the common ancestor node of a parent pattern. In such cases, one may build the sub-pattern virtual node at the sub-pattern common ancestor node and build the parent-pattern virtual node at the parent-pattern common ancestor node, instead of building all virtual nodes at the same parent-pattern ancestor node.

An interesting problem is how to build a virtual node across two tables connected by two referential nodes. Here, we illustrate a procedure for building a cross-table virtual node. Assume two tables $t_1$ and $t_2$ are connected by two referential nodes $n_1$ in $t_1$ and $n_2$ in $t_2$. Assume $n_1$ is a primary node and $n_2$ stores a sub-set of tokens in the $n_1$ memory. Suppose we want to build a virtual node from two leaf nodes, $l_1$ in $t_1$, and $l_2$ in $t_2$.

First, we build a virtual node in $t_1$ from $n_1$ and $l_1$ and build a virtual node in $t_2$ from $n_2$ and $l_2$, using the scheme presented earlier. Assume we use left hashing lists in which the left child tokens are list indices and right child tokens are list elements. Suppose we build a cross-table virtual node of the left hashing virtual memory in which tokens of $l_2$ are the list indices and tokens of $l_1$ are the list elements. For the virtual node in $t_1$, the memory tokens of the referential node $n_1$ are the hashing list indices and the memory tokens of leaf node $l_1$ are the list elements.

For the virtual node in $t_2$, the memory tokens of the referential node $n_2$ are the list elements and tokens of $l_2$ are the list indices. Now we replace every token of $n_2$ in the virtual node memory lists in $t_2$ by the corresponding list of tokens of $l_1$ in the virtual node memory in $t_1$, which has the list index identical to the $n_2$ token. Then we eliminate redundant list elements and keep counts of repeats. Thus, a cross-table virtual node is built in the left hashing form in which the $l_2$ tokens are the list indices and the $l_1$ tokens are the list elements.

This invention builds upon the approach identified above by providing a method for building a virtual memory tree structure. The general scheme is to find an closest common ancestor node, in an existing tree, of all leaf nodes that will be involved in the virtual tree, and to recall all the leaf tokens at the memory structure of the common ancestor node or propagate the leaf tokens to the common ancestor node, generating an information stream of the recalled tokens for each leaf node. In other words, by considering each stream of recalled tokens as a single information source which has the number of information events, equal to the cardinality of the common ancestor node, the invention is used to build a virtual tree from the recalled multiple information sources.

In many cases, the method may be simplified whenever the closest common ancestor node for a given pattern structure is different from the closest common ancestor node for its sub-pattern. In particular, a double-pattern virtual node may be built more efficiently by finding the closest common ancestor node of two given leaves in an existing structure; recalling tokens of the two leaves at two child nodes of the common ancestor node and replace the tokens of the two child nodes by the recalled leaf tokens in the hashing memory structure; reducing redundant indices of the hashing lists by combining the hash lists that have the identical hashing index; eliminating redundant elements in each hashing list and keep the counts of repeats; and sorting the remaining unique elements.

A virtual node or virtual tree provides a virtual structured information system for general information manipulations and general pattern demonstration in a given structure, such as on-line analytical processing (OLAP) and other user-initiative data mining manipulations.

I claim:

1. A method of building a virtual information structure with respect to an associative memory database, comprising the steps of:
   providing an input tree structure representative of the associative memory database, the input structure including a plurality of memory nodes;
   building a number of unstructured virtual information sources at a given memory node in an existing memory tree structure; and
   building a virtual structure from the unstructured virtual sources.

2. The method of claim 1, wherein the unstructured virtual information sources are memory tokens associated with at least certain of the nodes of the input structure.

3. The method of claim 1, wherein the unstructured virtual information sources are indices associated with at least certain of the nodes of the input structure.

4. The method of claim 1, including memory nodes having tokens or indices associated with an closest common ancestor node in the input structure, enabling the tokens or indices to be propagated to the closest common ancestor node when building the virtual structure from the unstructured virtual sources.

5. A method of creating a virtual node in an information tree structure, comprising the steps of:
   identifying two nodes a and b in an existing information tree structure, the two nodes having a common ancestor node $n_a$, wherein:
   a) the closest common ancestor node has a child node that is an ancestor node of only one node of the two nodes a and b, and
   b) the other child node of the common ancestor node $n_a$ is an ancestor node of the other one of the two nodes a and b;
   recalling the memory tokens, defined as the memory addresses of unique data values, of node a at the memory of node $n_l$, thereby replacing the original tokens stored at the $n_l$ memory with the recalled tokens of node a using one or more look-up tables;
   recalling the memory tokens of node b at the memory of node $n_r$, thereby replacing the original tokens stored at the $n_r$ memory with the recalled tokens of node a using one or more look-up tables;
   removing the redundancy of the list indices, if any such redundancy is present, by combining all the lists that have the same list index, so that all the new lists have unique indices;
   removing the redundancy of the list elements, if any such redundancy is present, by eliminating repetitious elements and storing a count the repeats in each new list,
   the result after redundancy removal being a virtual node memory structure identical to a real node as if it were built from the output streams of two leaf nodes a and b.

6. The method of claim 5, wherein the values of a and b exist in rows or records enabling the values to be presented on the virtual node by replacing the memory tokens in pairs by the corresponding field values after recalling dictionaries.

7. The method of claim 5, further including the step of presenting a pattern by printing out a list of data values of node b pairing with the same list index representing the corresponding data value in node a.

8. The method of claim 5, wherein the existing information tree structure includes some form of hashing storing a set of lists indexing left and right child nodes.

* * * * *